US012760217B2

(12) United States Patent
Mei

(10) Patent No.: US 12,760,217 B2
(45) Date of Patent: Oct. 13, 2026

(54) QUANTUM DOT MATERIAL, QUANTUM DOT LIGHT-EMITTING DEVICE AND PREPARATION METHOD THEREOF

(71) Applicants: Beijing BOE Technology Development Co., Ltd., Beijing (CN); BOE TECHNOLOGY GROUP CO., LTD., Beijing (CN)

(72) Inventor: Wenhai Mei, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 1111 days.

(21) Appl. No.: 17/796,310

(22) PCT Filed: Aug. 30, 2021

(86) PCT No.: PCT/CN2021/115327

§ 371 (c)(1),
(2) Date: Jul. 29, 2022

(87) PCT Pub. No.: WO2023/028757

PCT Pub. Date: Mar. 9, 2023

(65) Prior Publication Data

US 2024/0209255 A1 Jun. 27, 2024

(51) Int. Cl.
*C09K 11/02* (2006.01)
*C09K 11/06* (2006.01)
(Continued)

(52) U.S. Cl.
CPC .............. *C09K 11/06* (2013.01); *C09K 11/02* (2013.01); *C09K 11/54* (2013.01); *C09K 11/88* (2013.01)

(58) Field of Classification Search
CPC ........... G03F 7/004; G03F 7/038; C09D 5/22; C09K 11/02; C09K 11/025; C09K 11/56; C09K 11/883
See application file for complete search history.

(56) References Cited

U.S. PATENT DOCUMENTS

2005/0266246 A1 12/2005 Reiss et al.
2018/0100090 A1* 4/2018 Li .......................... C09J 129/04
2021/0163817 A1* 6/2021 Lieberman ............. C09K 11/62

FOREIGN PATENT DOCUMENTS

CN 103923643 A 7/2014
CN 105925215 A 9/2016
(Continued)

OTHER PUBLICATIONS

Delgado-Perez, "Sensing Chiral Drugs by using CdSe/ZnS Nanoparticles Capped with N-Acetyl-L-Cysteine Methyl Ester", Chem. Eur. J. , 19, 11068-11076. (Year: 2013).*
(Continued)

*Primary Examiner* — Matthew E. Hoban
*Assistant Examiner* — Lynne Edmondson
(74) *Attorney, Agent, or Firm* — HOUTTEMAN LAW LLC

(57) ABSTRACT

The disclosure provides quantum dot materials, quantum dot light-emitting devices and preparation methods thereof. The quantum dot material comprises a quantum dot body and a quantum dot ligand forming a coordination interaction there-with, the quantum dot ligand satisfying a first general formula comprising:

(Continued)

wherein A is a ligand group, B is a first linkage group, C1 is a first polar group, C2 is a second polar group, D1 is a second linkage group, D2 is a third linkage group, E is a terminal group; m is an integer greater than or equal to 1; i is an integer greater than or equal to 1; the first linkage group comprises $-(CH_2)_n-$; the second and third linkage groups each comprise at least one of

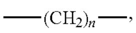

,
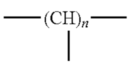
and
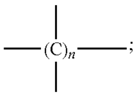 ;

and n is an integer greater than or equal to 0.

19 Claims, 1 Drawing Sheet

(51) Int. Cl.

| | |
|---|---|
| ***C09K 11/08*** | (2006.01) |
| ***C09K 11/54*** | (2006.01) |
| ***C09K 11/56*** | (2006.01) |
| ***C09K 11/88*** | (2006.01) |
| ***G03F 7/004*** | (2006.01) |

(56) References Cited

FOREIGN PATENT DOCUMENTS

| | | | |
|---|---|---|---|
| CN | 112051709 | A | 12/2020 |
| CN | 113088279 | A | 7/2021 |
| CN | 113248953 | A | 8/2021 |
| JP | 2020204756 | A | 12/2020 |

OTHER PUBLICATIONS

Zhang et al., "Compact PEGylated polymer-caged quantum dots with improved stability," Colloids and Surfaces A: Physicochem. Eng. Aspects, May 2012, pp. 72-79, vol. 402.

* cited by examiner

QUANTUM DOT MATERIAL, QUANTUM DOT LIGHT-EMITTING DEVICE AND PREPARATION METHOD THEREOF

This is a National Phase Application filed under 35 U.S.C. 371 as a national stage of PCT/CN2021/115327, filed on Aug. 30, 2021.

TECHNICAL FIELD

The present disclosure belongs to the field of display technology, and specifically relates to a quantum dot material, a quantum dot light-emitting device and a preparation method thereof.

BACKGROUND

Quantum dot light emitting diode display (QLED) is a new display technology developed based on organic light-emitting diode display (OLED). The difference of a QLED device from the OLED technology is in that the light-emitting layer of the QLED device is a quantum dot layer, wherein electrons/holes are injected into the quantum dot layer through an electron/hole transport layer, and electrons and holes are compounded in the quantum dot layer to emit light. Compared with the OLED technology, QLED has the advantages such as narrow light-emitting peaks, high color saturation and wide color gamut. As QLED research becomes more advanced and quantum efficiency continues to improve, the need to further adopt new processes and technologies to realize its industrialization has become a future trend.

Currently, quantum dots are generally patterned using photoetching process to prepare high-resolution QLED or QD-LCD. However, the current process of direct patterning the quantum dots is prone to form residues after the development process, which tends to cause color mixing in full-color quantum dot display and affect the display effect.

SUMMARY

The present disclosure aims to solve at least one of the technical problems existing in the prior art by providing a quantum dot material, a quantum dot light-emitting device and a method for preparing the same.

In a first aspect, the embodiments of the present disclosure provide a quantum dot material, wherein the quantum dot material comprises a quantum dot body and a quantum dot ligand forming a coordination interaction with the quantum dot body; the quantum dot ligand satisfying a first general formula comprising:

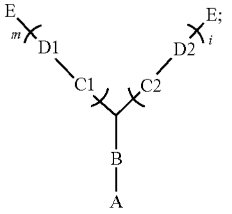

wherein A is a ligand group, B is a first linkage group, C1 is a first polar group, C2 is a second polar group, D1 is a second linkage group, D2 is a third linkage group, and E is a terminal group; m is an integer greater than or equal to 1; i is an integer greater than or equal to 1; the first linkage group comprises $-(CH_2)_n-$; the second linkage group and the third linkage group each comprise at least one of:

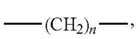, 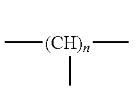 and 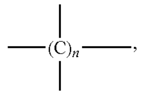, and n is an integer greater than or equal to 0.

Optionally, the first polar group and the second polar group each comprise at least one of:

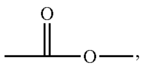, 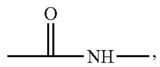, and .

Optionally, the terminal group comprises at least one of: —,

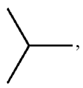, and 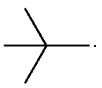.

Optionally, the chain segment in which the first polar group is present is a first main chain, the chain segment in which the second polar group is present is a second main chain, and the chain segment in which the ligand group is present is a branched chain;

a sum of the number of atoms in the first or the second main chain which comprises more atoms plus the number of atoms in the branched chain is greater than or equal to 5 and less than or equal to 12.

Optionally, the number of carbon atoms spaced between two adjacent first polar groups or two adjacent second polar groups is less than or equal to 2.

Optionally, when m is greater than or equal to 2, there are a plurality of the first polar groups and a plurality of the second linkage groups, and the plurality of the first polar groups are different and the plurality of the second linkage groups are different;

when i is greater than or equal to 2, there are a plurality of the second polar groups and a plurality of the third linkage groups, and the plurality of the second polar groups are different and the plurality of the third linkage groups are different.

Optionally, the first polar group is different from the second polar group.

Optionally, the quantum dot ligand has a chemical formula of

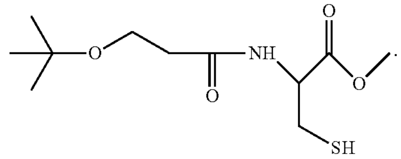 [SMILES: COC(=O)C(CS)NC(=O)CCOC(C)(C)C].

Optionally, the quantum dot ligand further comprises: a photosensitive group;

the photosensitive group is linked to the first polar group or the second polar group.

Optionally, the first polar group or the second polar group is a photosensitive group.

Optionally, the quantum dot comprises at least one of CdS, CdSe, ZnSe, InP, PbS, $CsPbCl_3$, $CsPbBr_3$, $CsPhI_3$, CdS/ZnS, CdSe/ZnS, ZnSe, InP/ZnS, PbS/ZnS, $CsPbCl_3$/ZnS, $CsPbBr_3$/ZnS and $CsPhI_3$/ZnS.

In a second aspect, the embodiments of the present disclosure provide a quantum dot light emitting device, wherein the quantum dot light emitting device comprises: a first electrode layer and a second electrode layer disposed opposite to each other, and a light emitting layer between the first electrode layer and the second electrode layer; the light emitting layer comprising the quantum dot material described above.

Optionally, the light emitting layer further comprises: a quantum dot product formed by light exposure of the quantum dot material.

Optionally, the quantum dot material has the chemical formula of

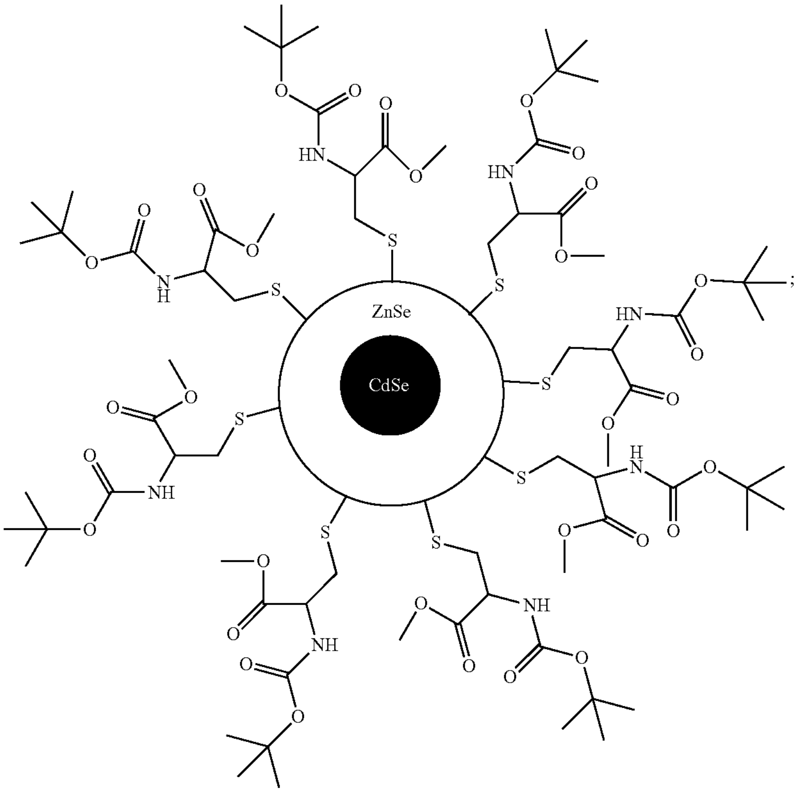

the quantum dot product has the chemical formula of

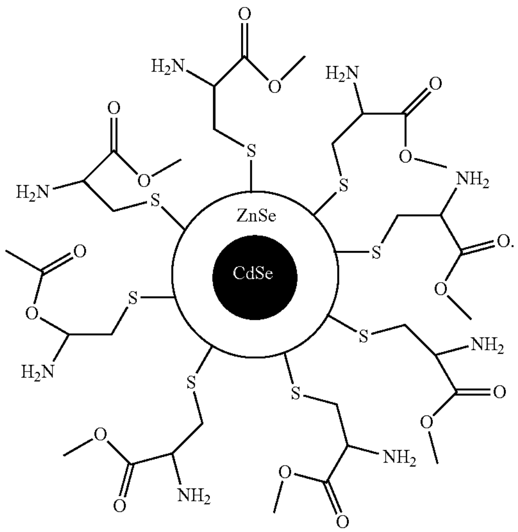

In a third aspect, the embodiments of the present disclosure provide a method of preparing a quantum dot light emitting device, wherein the method of preparing a quantum dot light emitting device comprises:

forming a first electrode layer on a substrate, forming a quantum dot material layer on the first electrode layer and photoetching the quantum dot material layer to form a light emitting layer, wherein the quantum dot material layer comprises the quantum dot material described above, and forming a second electrode layer on the light emitting layer.

Optionally, the forming a quantum dot material layer on the first electrode layer and photoetching the quantum dot material layer to form a light emitting layer comprises:

adding a photo acid generating agent to the quantum dot material under light exposure condition such that the quantum dot material and the photo acid generating agent react to form the light-emitting layer.

DETAILED DESCRIPTION OF EMBODIMENTS

Figure 1:
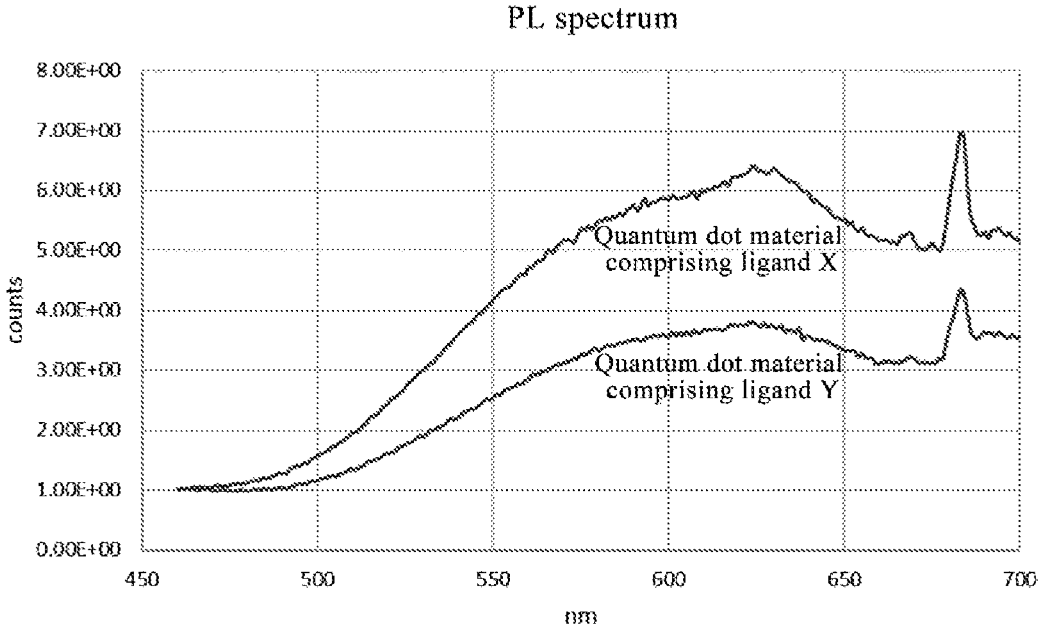
FIG. 1 is a schematic diagram of the solubility of quantum dot materials in a polar solvent provided in embodiments of the present disclosure.

To enable those skilled in the art to better understand the technical embodiments of the present disclosure, the present disclosure will be described in detail below with reference to the accompanying drawings and specific embodiments.

Unless otherwise defined, the technical or scientific terms used in this disclosure shall have the ordinary meaning as understood by one of skilled in the art to which this disclosure pertains. The terms "first", "second" and the like as used in this disclosure do not indicate any order, number, or importance, but are used only to distinguish the different components. Similarly, the word "a", "an" or "the" and similar words do not indicate a numerical limitation, but rather the presence of at least one. The wording such as "include" or "comprise" and the like are intended to mean that the components or objects appearing before the words encompass the components or objects listed after the words and their equivalents, and do not exclude other components or objects. The wording such as "connected" or "linked" and the like are not limited to physical or mechanical connections, but may include electrical connections, either direct or indirect. The terms "up", "down", "left", "right", etc., are used only to indicate relative position relationship, and when the absolute position of the object being described is changed, the relative position relationship may also be changed accordingly.

At present, quantum dots are generally patterned using photoetching to prepare high-resolution QLED or QD-LCD. However, the current process of direct patterning the quantum dots is prone to form residues after the development process, which tends to cause color mixing in full-color quantum dot display and affect the display effect.

In order to solve at least one of the above technical problems, the embodiments of the present disclosure provide a quantum dot material, a quantum dot light-emitting device, a display substrate and methods for preparing the same. The quantum dot material, the quantum dot light-emitting device, the display substrate and the preparation methods thereof will be further described in detail below with reference to the accompanying drawings and specific embodiments.

Embodiments of the present disclosure provide a quantum dot material comprising: a quantum dot body and a quantum dot ligand forming a coordination interaction with the quantum dot body; the quantum dot ligand satisfying a first general formula comprising:

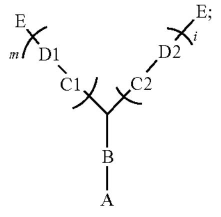

where A is a ligand group, B is a first linkage group, C1 is a first polar group, C2 is a second polar group, D1 is a second linkage group, D2 is a third linkage group, E is a terminal group; m is an integer greater than or equal to 1; i is an integer greater than or equal to 1; the first linkage group comprises: $—(CH_2)_n—$; the second linkage group and the third linkage group each comprise at least one of $—(CH_2)_n—$, 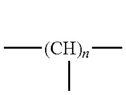 and 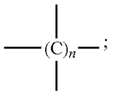;

and n is an integer greater than or equal to 0.

The ligand group can form a ligand bond with the surface of the quantum dot body such that the quantum dot ligand and the quantum dot body can be connected to form a quantum dot material having a quantum dot ligand and can reduce the defects on the surface of the quantum dot. The first linkage group can connect the ligand group to other groups, thus allowing the ligand bond, together with the other groups, to form the quantum dot ligand. The first polar group and the second polar group are both polar, and they are compatible with polar solvents to improve the solubility of the quantum dot ligand in polar solvents. The second linkage group and the third linkage group can connect the first polar group and the second polar group with other groups respectively, so as to form a quantum dot ligand with higher solubility. The terminal group may be formed at the end of each chain segment in the quantum dot ligand, which can improve the stability of the quantum dot ligand.

It should be noted here that in the above first general formula, that m is an integer greater than or equal to 1 and i is an integer greater than or equal to 1 means the quantum dot ligand may be formed with one or more first polar groups, one or more second polar groups, or only with the first polar group(s) and without the second polar group. The specific chemical structure thereof may be set according to practical needs and is not limited here. It should be further noted that n is an integer greater than or equal to 0. When n is 0, it means that the number of the first linkage group, the second linkage group and the third linkage group in the quantum dot material is 0. It is possible to form a direct connection between the polar group and the terminal group, and between the ligand group and the polar group, and in the embodiments of the present disclosure, it is not necessary to have the linkage group between the two groups.

In the quantum dot material provided in the embodiments of the present disclosure, the quantum dot ligand is linked to the surface of the quantum dot, wherein the quantum dot ligand may be a branched structure as shown in the first general formula above, and a first polar group and/or a second polar group may be formed in the quantum dot ligand. Since both the first polar group and the second polar group can improve the solubility of the quantum dot ligand in a polar solvent and thus can improve the overall solubility of the quantum dot material in the polar solvent, when the quantum dot material is patterned using the photoetching process, excess quantum dot material may be dissolved by the polar solvent and removed completely, thereby avoiding the residue of the excess quantum dot material which would otherwise cause the mixing of quantum dot materials of different colors. Thus, the mixing of colors in the full-color quantum dot display can be avoided to improve the display effect.

In some embodiments, the ligand group comprises at least one of: sulfhydryl group, amino group, carboxyl group and phosphorus oxygen group. The sulfhydryl group (—SH), amino group (—NH2), carboxyl group

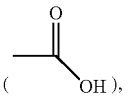

and phosphorus oxygen group

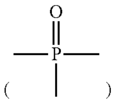

all have strong coordination ability with the atoms on the surface of the quantum dots, which can form a stable connection between the quantum dot body and the quantum dot ligand to improve the stability of the quantum dot material. Preferably, the ligand group in the embodiments of the present disclosure is a sulfhydryl group (—SH), which has a stronger coordination ability than other ligands.

In some embodiments, the first polar group and the second polar group each comprise at least one of:

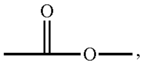,
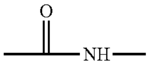
and
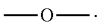.

It is noted herein that a polar group is a group in which the centers of positive and negative charges do not coincide, and specifically, it may be considered that the centers of the positive and negative charges do not coincide when the atoms at the two ends of a chemical bond have different electronegativities. Specifically, both the first polar group and the second polar group in the embodiments of the present disclosure may comprise ester group

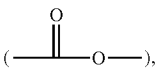, amide group

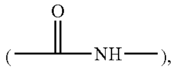, and ether bond (—O—), all of which have relatively strong polarity and are highly soluble in polar solvents. Therefore, the overall solubility of the quantum dot material in the polar solvent can be improved, and when the quantum dot material is patterned by the photoetching process, the polar solvent may be used to dissolve and completely remove the excess quantum dot material, so that the residue of the excess quantum dot material which may cause the mixing of quantum dot materials of different colors can be avoided, and thus the mixing of colors in the full-color quantum dot display can be avoided to improve the display effect.

In some embodiments, the terminal group may specially be at least one of —,

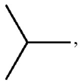, and 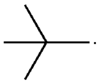.

It is noted that the terminal groups —,

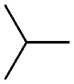 and 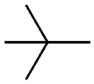

may be formed at the ends of the various chain segments in the quantum dot ligand, which can improve the stability of the quantum dot ligand.

In some embodiments, the chain segment in which the first polar group is present is the first main chain, the chain segment in which the second polar group is present is the second main chain, and the chain segment in which the ligand group is present is the branched chain; and the sum of the number of atoms in the first or the second main chain which comprises more atoms plus the number of atoms in the branched chain is greater than or equal to 5 and less than or equal to 12.

That the sum of the number of atoms in the first or the second main chain which comprises more atoms plus the number of atoms in the branched chain is greater than or equal to 5 can ensure that the quantum dot material has good solubility in the polar solvent and avoid the quantum dot material from agglomerating in the solvent and resulting in the residue of excess quantum dot material during the photoetching process, and that the sum of the number of atoms in the first or the second main chain which comprises more atoms plus the number of atoms in the branched chain is less than or equal to 12 can ensure the transmission performance of the quantum dot material with regard to the carriers so as to improve the luminescent brightness of the quantum dot light-emitting device, and thus ensure the display effect of the display substrate.

In some embodiments, the number of carbon atoms spaced between two adjacent first polar groups or two adjacent second polar groups is less than or equal to 2.

When the quantum dot ligand has a plurality of first polar groups or a plurality of second polar groups, the adjacent first polar groups may be connected to each other through a second linkage group, and the adjacent second polar groups may be connected to each other through a third linkage group, and the number of carbon atoms spaced between two adjacent first polar groups or two adjacent second polar groups is less than or equal to 2. This can ensure the connection while preventing longer chain segments from affecting the stability of the overall quantum dot material.

In some embodiments, when m is greater than or equal to 2, there are a plurality of the first polar groups and a plurality of the second linkage groups, and the plurality of the first polar groups are different and the plurality of the second linkage groups are different; when i is greater than or equal to 2, there are a plurality of the second polar groups and a plurality of the third linkage groups, and the plurality of the second polar groups are different and the plurality of the third linkage groups are different.

In practical applications, when the number of the first polar groups and the number of the second polar groups are plural, the plurality of first polar groups may be different, and the plurality of second polar groups may also be different. For example, a portion of the plurality of the first polar groups may be ester groups

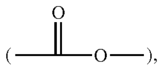

and the other portion of the first polar groups may be amide groups

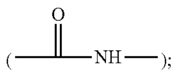

a portion of the plurality of the second polar groups may be amide groups

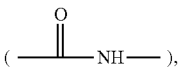

and the other portion of the second polar groups may be ether bonds (—O—). Of course, the respective first polar groups can be the same, and the respective second polar groups can be the same. The quantum dot ligand with a plurality of the polar groups may be formed as desired to improve the solubility of the overall quantum dot material in a solvent, such that when the quantum dot material is patterned by the photoetching process, excess quantum dot material may be dissolved and completely removed by a polar solvent, thus avoiding the residue of excess quantum dot material which would otherwise cause the mixing of quantum dot materials of different colors, and thus avoiding the mixing of colors in the full-color quantum dot display to improve the display effect.

In some embodiments, the first polar group and the second polar group are different.

In practical applications, the first polar group and the second polar group may be different groups. For example, the first polar group may be ester group

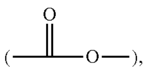

and the second polar group may be ether bond (—O—). Of course, the first polar group and the second group may also be the same. The quantum dot ligand with a plurality of the polar groups may be formed as desired to improve the solubility of the overall quantum dot material in a solvent, such that when the quantum dot material is patterned by the photoetching process, excess quantum dot material may be dissolved and completely removed by a polar solvent, thus avoiding the residue of the excess quantum dot material which would otherwise cause the mixing of quantum dot materials of different colors, and thus avoiding the mixing of colors in the full-color quantum dot display to improve the display effect.

Specifically, the chemical formula of the quantum dot ligand is:

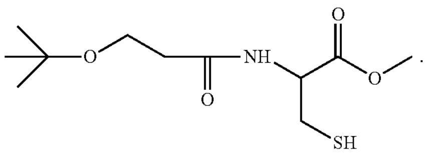 [SMILES: COC(=O)C(CS)NC(=O)CCOC(C)(C)C]

From the above chemical formula, it can be seen that the quantum dot ligand has a plurality of polar groups, all of which have relatively strong polarity and are highly soluble in polar solvents. Therefore, the solubility of the overall quantum dot material in the polar solvents can be improved, and when the quantum dot material is patterned using the photoetching process, excess quantum dot material can be dissolved and completely removed by a polar solvent, so that the residue of the excess quantum dot material that may cause the mixing of quantum dot materials of different colors can be avoided, and thus the mixing of colors in the full-color quantum dot display can be avoided to improve the display effect.

In some embodiments, the quantum dot ligand further comprises a photosensitive group, the photosensitive group being connected to the first polar group or the second polar group.

The photosensitive group can undergo a chemical reaction under the condition of light exposure, so that the chemical bond formed by the photosensitive group therein is broken. In the photoetching process, light rays such as ultraviolet light can be used to irradiate and pattern the quantum dot material, such that excess quantum dot material can be removed and thus a pattern of quantum dot materials in different colors can be formed. In practical applications, the polar group in the quantum dot ligand can also be a photosensitive group, which can not only facilitate the patterning of the quantum dot material, but also improve the solubility of the quantum dot material in the polar solvent to avoid the residue of excess quantum dot material which would otherwise cause mixing of quantum dot materials of different colors.

In some embodiments, the quantum dot comprises at least one of CdS, CdSe, ZnSe, InP, PbS, $CsPbCl_3$, $CsPbBr_3$, $CsPbI_3$, CdS/ZnS, CdSe/ZnS, ZnSe, InP/ZnS, PbS/ZnS, $CsPbCl_3$/ZnS, $CsPbBr_3$/ZnS and $CsPbI_3$/ZnS.

It is noted here that the quantum dots may be at least one of CdS, CdSe, ZnSe, InP, PbS, $CsPbCl_3$, $CsPbBr_3$, $CsPbI_3$, CdS/ZnS, CdSe/ZnS, ZnSe, InP/ZnS, PbS/ZnS, $CsPbCl_3$/ZnS, $CsPbBr_3$/ZnS and $CsPbI_3$/ZnS. The specific type of the quantum dots can be selected reasonably according to practical needs and is not limited here.

The solubility of the quantum dot material provided by the embodiments of the present disclosure in an organic solvent will be described in further detail below by taking two different quantum dot materials as examples.

The chemical formula of the quantum dot ligand X in the first quantum dot material is:

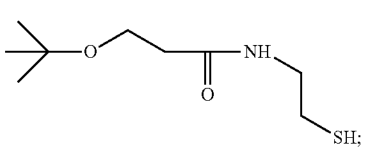

and the chemical formula of the quantum dot ligand Y in the second quantum material is:

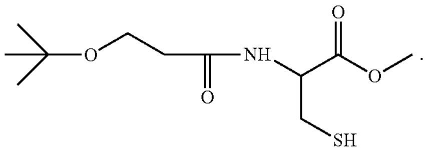 [SMILES: COC(=O)C(CS)NC(=O)CCOC(C)(C)C]

In the practical application, red light quantum dot materials containing ligand X and ligand Y may be prepared by ligand exchange, respectively. The two quantum dot material solutions having the same concentration were spin-coated onto a sol-gel zinc oxide substrate to form a film and developed using chloroform. The developed film was subjected to emission spectroscopy testing (FIG. 1), and after normalizing the emission peaks of zinc oxide in the test curve, it can be seen from the figure that the number of photons at the red light emission peak of the film using ligand X is about 1.6 times higher than that of the corresponding emission peak of film using ligand Y. The red light quantum dot material containing ligand Y can effectively reduce the residual quantum dot material by about 40%.

Embodiments of the present disclosure also provide a quantum dot light-emitting device comprising: a first electrode layer and a second electrode layer disposed opposite to each other, and a light-emitting layer between the first electrode layer and the second electrode layer; wherein the light-emitting layer comprises the quantum dot material as provided in any of the above embodiments. The light-emitting layer comprises: the quantum dot material as provided in any of the above embodiments.

Optionally, the light-emitting layer may further comprise a quantum dot product formed after the quantum dot material is subjected to light exposure.

In some embodiments, the quantum dot material may have a chemical formula of

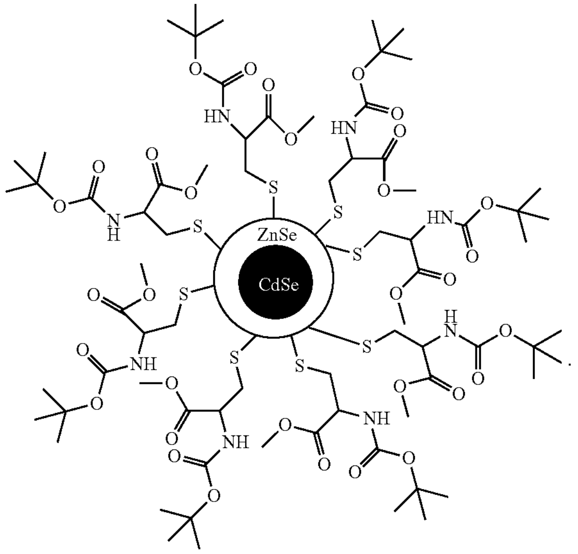

The chemical formula of the quantum dot product may be:

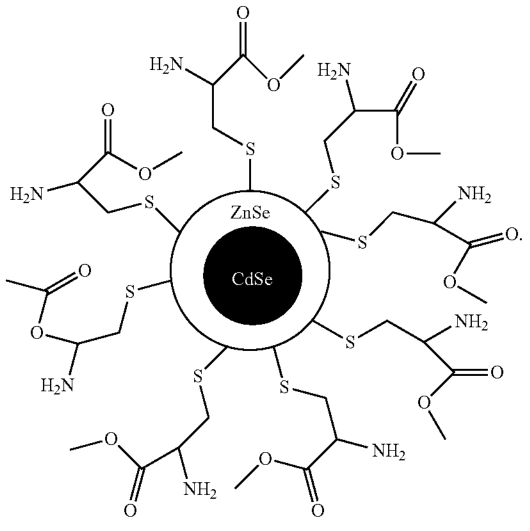

Specifically, the chemical reaction scheme of the quantum dot material during the photoetching process is as follows:

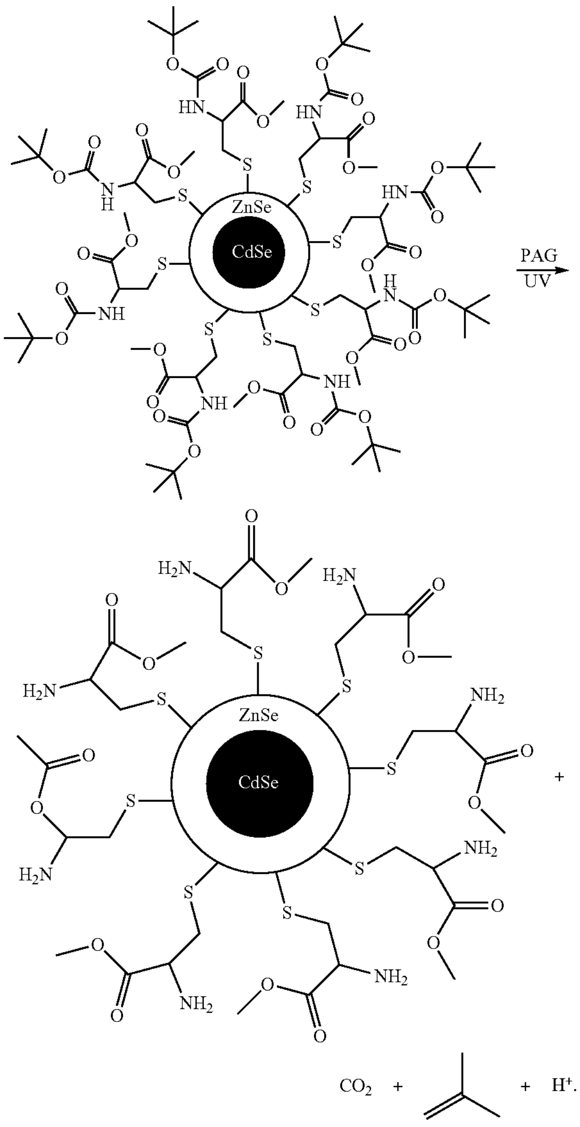

The light-emitting layer in the quantum dot light-emitting device provided in the embodiments of the present disclosure is made of the quantum dot material described above and the quantum dot product formed after the quantum dot material is subjected to light exposure, with the quantum dot ligand in the quantum dot material linked to the surface of the quantum dot, wherein the quantum dot ligand may be a branched structure as shown in the first general formula above, and a first polar group and/or a second polar group may be formed in the quantum dot ligand. Since both the first polar group and the second polar group can improve the solubility of the quantum dot ligand in a polar solvent, the solubility of the overall quantum dot material in the solvent can be improved. Thus, when the quantum dot material is patterned using the photoetching process, excess quantum dot material can be dissolved and removed completely by the polar solvent, thereby avoiding the residue of the excess quantum dot material which would otherwise cause mixing of quantum dot materials of different colors, and in turn avoiding color mixing in full-color quantum dot display to improve the display effect.

Embodiments of the present disclosure also provide a display apparatus comprising the quantum dot light-emitting device as provided in any of the above embodiments. The display apparatus may be a cell phone, TV, tablet PC, car recorder and other terminal devices with display functions. The realization principle and beneficial effects thereof are the same as those of the quantum dot material described above, which are not repeated here.

Figure 2:
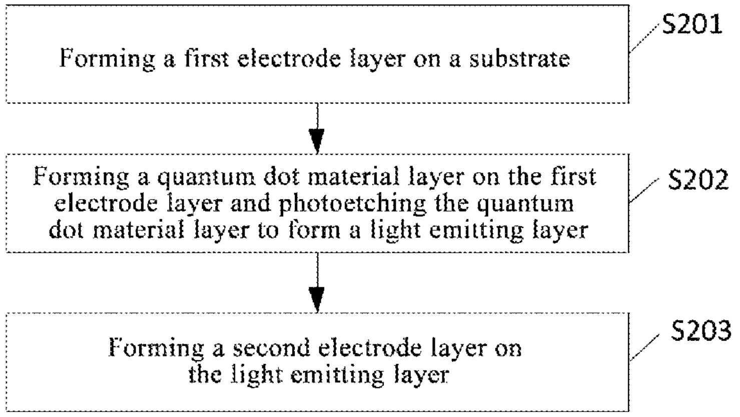
FIG. 2 is a schematic diagram of the flowchart of the preparation method of the quantum dot light emitting device provided by embodiments of the present disclosure.

Embodiments of the present disclosure also provide a method of preparing a display substrate, and FIG. 2 is a schematic diagram showing the process of preparing a display substrate provided by the embodiments of the present disclosure. As shown in FIG. 2, the method of preparing the display substrate includes the following steps:

S201, forming a first electrode layer on a substrate; and

S202, forming a quantum dot material layer on the first electrode layer, and photoetching the quantum dot material layer to form a light-emitting layer.

In step S202, the quantum dot material layer comprises a quantum dot material as described above, the quantum dot material comprising: a quantum dot body and a quantum dot ligand forming a coordination interaction with the quantum dot body; the quantum dot ligand satisfying a first general formula comprising:

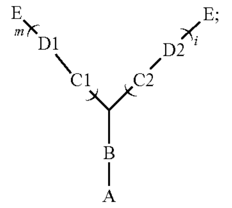

where A is a ligand group, B is a first linkage group, C1 is a first polar group, C2 is a second polar group, D1 is a second linkage group, D2 is a third linkage group, E is a terminal group; m is an integer greater than or equal to 1; i is an integer greater than or equal to 1; the first linkage group comprises: $-(CH_2)_n-$; the second linkage group and the third linkage group each comprise at least one of

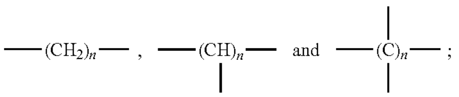

and n is an integer greater than or equal to 0.

Next, in S203, a second electrode layer is formed on the light-emitting layer.

In some embodiments, the above step S202 of forming a quantum dot material layer on the first electrode layer and photoetching the quantum dot material layer to form a light-emitting layer comprises: adding a photo acid generating agent to the quantum dot material under the condition of light exposure such that the quantum dot material and the photo acid generating agent react to form the light-emitting layer.

The photosensitive group in the quantum dot material may be broken to generate a quantum dot product under the condition of light exposure and by the action of the photo acid generating agent, and thus the polar group is destroyed, resulting in that the solubility of the quantum dot product in a polar solvent is much lower than the solubility of the original quantum dot material in the polar solvent. Thus, the polar solvent may be used to remove the excess quantum dot material, avoiding the residue of the quantum dot material.

Specifically, the chemical reaction scheme of the quantum dot material during the photoetching process is as follows:

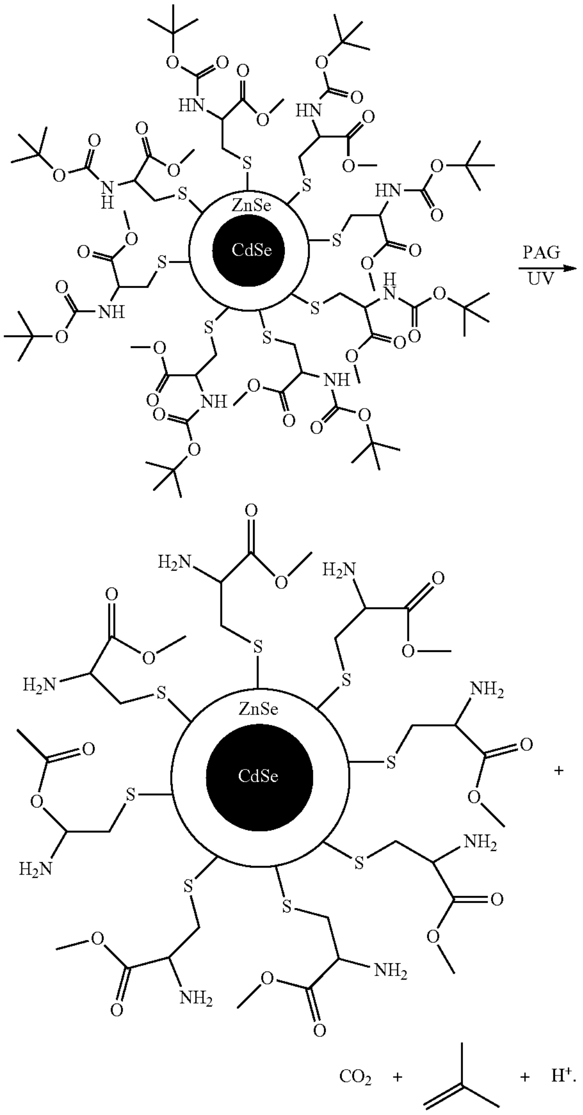

The preparation process of the quantum dot light-emitting device provided by embodiments of the present disclosure will be specially described below in conjunction with the structure of a specific quantum dot light-emitting device.

As a first implementation, the quantum dot light-emitting device is an inverted bottom-emission light-emitting device, and the preparation process thereof will be described below.

The quantum dot material is CdSe/ZnS core-shell structure with an original ligand of pyridine at a concentration of 20 mg/ml. 1 ml of the quantum dot solution was taken and 0.33 ml of ligand Y was added thereto, and the ligand exchange was completed by stirring at room temperature for 4 h. After that, the quantum dots were precipitated using 8 ml of methanol, and the supernatant was discarded after centrifugation. Then, the quantum dots were dissolved in 1 ml of chloroform and precipitated using 8 ml of methanol, and the supernatant was discarded after centrifugation. The quantum dot powder was redissolved in toluene after vacuum extraction at 80° C. to form a 20 mg/ml solution.

Nickel oxide nanoparticles were spin-coated (2000 rpm, 30 s, 25 mg/ml) on ITO substrate in nitrogen, and annealed at 120° C. for 20 minutes. Y-ligand-containing red quantum dot solution, to which 5 wt % of 2,4-bis(trichloromethyl)-6-p-methoxystyryl-S-triazine was added as a photo acid generating agent, was spin-coated (3000 rpm, 30 s) in air. After spin-coating, the film was exposed to UV at 150 mj, and the film layer was developed using chloroform after exposure, and a patterned red quantum dot light-emitting layer was formed by annealing at 120° C. for 20 minutes after completion of development.

Y-ligand-containing green quantum dot solution, to which 3 wt % of 2,4-bis(trichloromethyl)-6-p-methoxystyrene-S-triazine was added as a photo acid generating agent, was spin-coated (3000 rpm, 30 s) in air. After spin-coating, the film was exposed to UV at 300 mj, and the film layer was developed using chloroform after exposure, and a patterned green quantum dot light-emitting layer was formed by annealing at 120° C. for 20 minutes after completion of development.

Y-ligand-containing blue quantum dot solution, to which 2 wt % of 2,4-bis(trichloromethyl)-6-p-methoxystyrene-S-triazine was added as a photo acid generating agent, was spin-coated (3000 rpm, 30 s) in air. After spin-coating, the film was exposed to UV at 300 mj, and the film layer was developed using chloroform after exposure, and a patterned blue quantum dot light emitting-layer was formed by annealing at 120° C. for 20 minutes after completion of development.

ZnO nanoparticles were further spin-coated (3000 rpm, 30 s, 30 mg/ml), and annealed at 120° C. for 20 minutes, followed by evaporation deposition of 120 nm aluminum electrode and encapsulation to complete the preparation of the inverted bottom-emission light-emitting device.

As a second implementation, the quantum dot light-emitting device is an upward bottom-emission light-emitting device, and the preparation process thereof will be described below.

Nickel oxide nanoparticles were spin-coated (2000 rpm, 30 s, 25 mg/ml) on ITO substrate in nitrogen atmosphere, and annealed at 120° C. for 20 minutes. Y-ligand-containing red quantum dot solution, to which 5 wt % of 2,4-bis(trichloromethyl)-6-p-methoxystyryl-S-triazine was added as a photo acid generating agent, was spin-coated (3000 rpm, 30 s) in air. After spin-coating, the film was exposed to UV at 150 mj, and the film layer was developed using chloroform after exposure, and a patterned red quantum dot light-emitting layer was formed by annealing at 120° C. for 20 minutes after completion of development.

Y-ligand-containing green quantum dot solution, to which 3 wt % of 2,4-bis(trichloromethyl)-6-p-methoxystyrene-S-triazine was added as a photo acid generating agent, was spin-coated (3000 rpm, 30 s) in air. After spin-coating, the film was exposed to UV at 300 mj, and the film layer was developed using chloroform after exposure, and a patterned green quantum dot light-emitting layer was formed by annealing at 120° C. for 20 minutes after completion of development.

Y-ligand-containing blue quantum dot solution, to which 2 wt % of 2,4-bis(trichloromethyl)-6-p-methoxystyrene-S-triazine was added as a photo acid generating agent, was spin-coated (3000 rpm, 30 s) in air. After spin-coating, the film was exposed to UV at 300 mj, and the film layer was developed using chloroform after exposure, and a patterned blue quantum dot light emitting-layer was formed by annealing at 120° C. for 20 minutes after completion of development.

ZnO nanoparticles were further spin-coated (3000 rpm, 30 s, 30 mg/ml), and annealed at 120° C. for 20 minutes, followed by evaporation deposition of 120 nm aluminum electrode and encapsulation to complete the preparation of the upward bottom emission light-emitting device.

As a third implementation, the quantum dot light-emitting device is an upward top-emission light-emitting device, and the preparation process thereof will be described below.

The quantum dot material is CdSe/ZnS core-shell structure with an original ligand of pyridine at a concentration of 20 mg/ml. 1 ml of the quantum dot solution was taken and 0.33 ml of ligand Y was added thereto, and the ligand exchange was completed by stirring at room temperature for 4 h. After that, the quantum dots were precipitated using 8 ml of methanol, and the supernatant was discarded after centrifugation. The quantum dots were dissolved using 1 ml of chloroform and precipitated using 8 ml of methanol, and the supernatant was discarded after centrifugation. The quantum dot powder was redissolved in toluene after vacuum extraction at 80° C. to form a 20 mg/ml solution.

Nickel oxide nanoparticles were spin-coated (2000 rpm, 30 s, 25 mg/ml) on ITO/Ag/ITO substrate in nitrogen, and annealed at 120° C. for 20 minutes. Y-ligand-containing red quantum dot solution, to which 5 wt % of 2,4-bis(trichloromethyl)-6-p-methoxystyryl-S-triazine was added as a photo acid generating agent, was spin-coated (3000 rpm, 30 s) in air. After spin-coating, the film was exposed to UV at 150 mj, and the film layer was developed using chloroform after exposure, and a patterned red quantum dot light-emitting layer was formed by annealing at 120° C. for 20 minutes after completion of development.

Y-ligand-containing green quantum dot solution, to which 3 wt % of 2,4-bis(trichloromethyl)-6-p-methoxystyrene-S-triazine was added as a photo acid generating agent, was spin-coated (3000 rpm, 30 s) in air. After spin-coating, the film was exposed to UV at 300 mj, and the film layer was developed using chloroform after exposure, and a patterned green quantum dot light emitting-layer was formed by annealing at 120° C. for 20 minutes after completion of development.

Y-ligand-containing blue quantum dot solution, to which 2 wt % of 2,4-bis(trichloromethyl)-6-p-methoxystyrene-S-triazine was added as a photo acid generating agent, was spin-coated in air (3000 rpm, 30 s). After spin-coating, the film was exposed to UV at 300 mj, and the film layer was developed using chloroform after exposure, and a patterned blue quantum dot light-emitting layer was formed by annealing at 120° C. for 20 minutes after completion of development.

ZnO nanoparticles were further spin-coated (3000 rpm, 30 s, 30 mg/ml), and annealed at 120° C. for 20 minutes, followed by sputtering deposition of 50 nm indium gallium zinc oxide (IGZO) electrode and encapsulation to complete the preparation of the upward top emission light-emitting device.

It will be understood that the above embodiments and implementations are only exemplary embodiments adopted to illustrate the principles of the present disclosure, while the present disclosure is not limited thereto. For a person of ordinary skill in the art, various variations and improvements can be made without departing from the spirit and substance of the present disclosure, and these variations and improvements are also considered to be within the scope of protection of the present disclosure.

What is claimed is:

1. A quantum dot material, wherein the quantum dot material comprises a quantum dot body and a quantum dot ligand forming a coordination interaction with the quantum dot body, the quantum dot ligand satisfying a first general formula comprising:

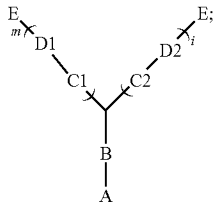

wherein A is a ligand group, B is a first linkage group, C1 is a first polar group, C2 is a second polar group, D1 is a second linkage group, D2 is a third linkage group, and E is a terminal group; m is an integer greater than or equal to 1; i is an integer greater than or equal to 1; the first linkage group comprises $-(CH_2)_n-$; the second linkage group and the third linkage group each comprise at least one of:

$-(CH_2)_n-$, 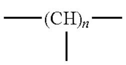 and 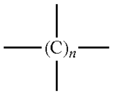, and n is an integer greater than or equal to 0, wherein, when m is greater than or equal to 2, there are a plurality of the first polar groups and a plurality of the second linkage groups, and wherein the plurality of the first polar groups are different and the plurality of the second linkage groups are different; and when i is greater than or equal to 2, there are a plurality of the second polar groups and a plurality of the third linkage groups, and wherein the plurality of the second polar groups are different and the plurality of the third linkage groups are different.

2. The quantum dot material according to claim 1, wherein the first polar group and the second polar group each comprise at least one of:

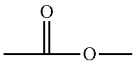, 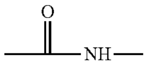, and $-O-$.

3. The quantum dot material according to claim 1, wherein the terminal group comprises at least one of: -,

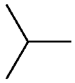 , and 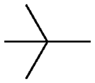 .

4. The quantum dot material according to claim 1, wherein the chain segment in which the first polar group is present is a first main chain, the chain segment in which the second polar group is present is a second main chain, and the chain segment in which the ligand group is present is a branched chain, and wherein a sum of the number of atoms in the first or the second main chain which comprises more atoms plus the number of atoms in the branched chain is greater than or equal to 5 and less than or equal to 12.

5. The quantum dot material according to claim 1, wherein the number of carbon atoms spaced between two adjacent first polar groups or two adjacent second polar groups is less than or equal to 2.

6. The quantum dot material according to claim 1, wherein the first polar group is different from the second polar group.

7. The quantum dot material according to claim 1, wherein the quantum dot ligand has a chemical formula of

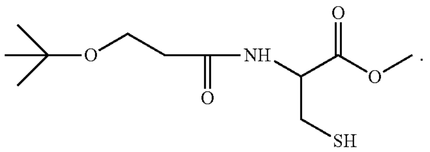 [SMILES: COC(=O)C(CS)NC(=O)CCOC(C)(C)C]

8. The quantum dot material according to claim 1, wherein the quantum dot ligand further comprises a photosensitive group; and wherein the photosensitive group is linked to the first polar group or the second polar group.

9. The quantum dot material according to claim 1, wherein the first polar group or the second polar group is a photosensitive group.

10. The quantum dot material according to claim 1, wherein the quantum dot comprises at least one of CdS, CdSe, ZnSe, InP, PbS, $CsPbCl_3$, $CsPbBr_3$, $CsPhI_3$, CdS/ZnS, CdSe/ZnS, ZnSe, InP/ZnS, PbS/ZnS, $CsPbCl_3$/ZnS, $CsPbBr_3$/ZnS and $CsPhI_3$/ZnS.

11. A quantum dot light emitting device, wherein the quantum dot light emitting device comprises: a first electrode layer and a second electrode layer disposed opposite to each other, and a light emitting layer between the first electrode layer and the second electrode layer, the light emitting layer comprising the quantum dot material according to claim 1.

12. The quantum dot light emitting device according to claim 11, wherein the light emitting layer further comprises: a quantum dot product formed by light exposure of the quantum dot material.

13. The quantum dot light emitting device according to claim 12, wherein the quantum dot material has a chemical formula of

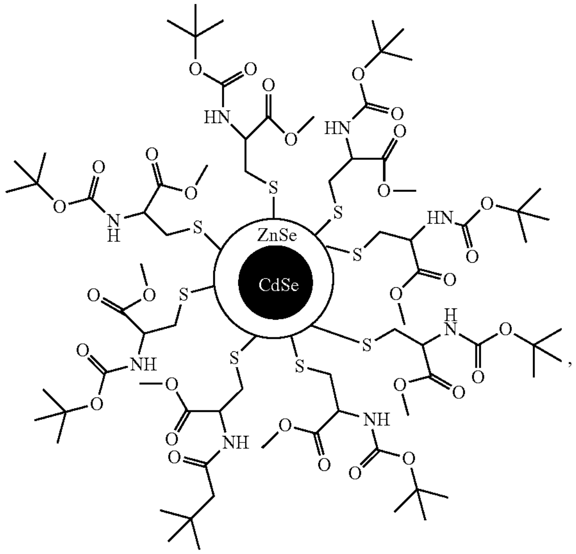

and the quantum dot product has a chemical formula of

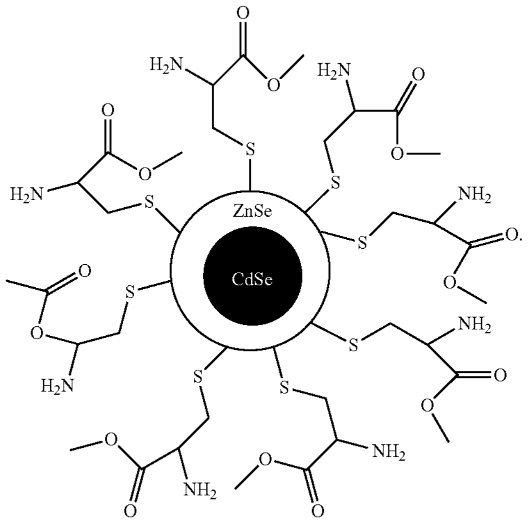

14. A method of preparing a quantum dot light emitting device, wherein the method of preparing a quantum dot light emitting device comprises:

forming a first electrode layer on a substrate;

forming a quantum dot material layer on the first electrode layer and photoetching the quantum dot material layer to form a light emitting layer, wherein the quantum dot material layer comprises the quantum dot material according to claim 1; and forming a second electrode layer on the light emitting layer.

15. The method of preparing a quantum dot light emitting device according to claim 14, wherein the forming a quantum dot material layer on the first electrode layer and photoetching the quantum dot material layer to form a light emitting layer comprises:

adding a photo acid generating agent to the quantum dot material under light exposure condition such that the quantum dot material and the photo acid generating agent react to form the light-emitting layer.

16. A display apparatus comprising the quantum dot light-emitting device according to claim 11.

17. The display apparatus according to the claim 16, wherein the display apparatus is selected from a cell phone, TV, tablet PC, car recorder and other terminal devices with display functions.

18. A method of preparing a display substrate, comprising the following steps:

forming a first electrode layer on a substrate; and forming a quantum dot material layer on the first electrode layer, and photoetching the quantum dot material layer to form a light-emitting layer, and forming a second electrode layer on the light-emitting layer, wherein the quantum dot material layer comprises the quantum dot material according to the claim 1.

19. The method according to the claim 18, wherein the step of forming a quantum dot material layer on the first electrode layer and photoetching the quantum dot material layer to form a light-emitting layer comprises: adding a photo acid generating agent to the quantum dot material under the condition of light exposure such that the quantum dot material and the photo acid generating agent react to form the light-emitting layer.

* * * * *